United States Patent Office 3,410,301
Patented Nov. 12, 1968

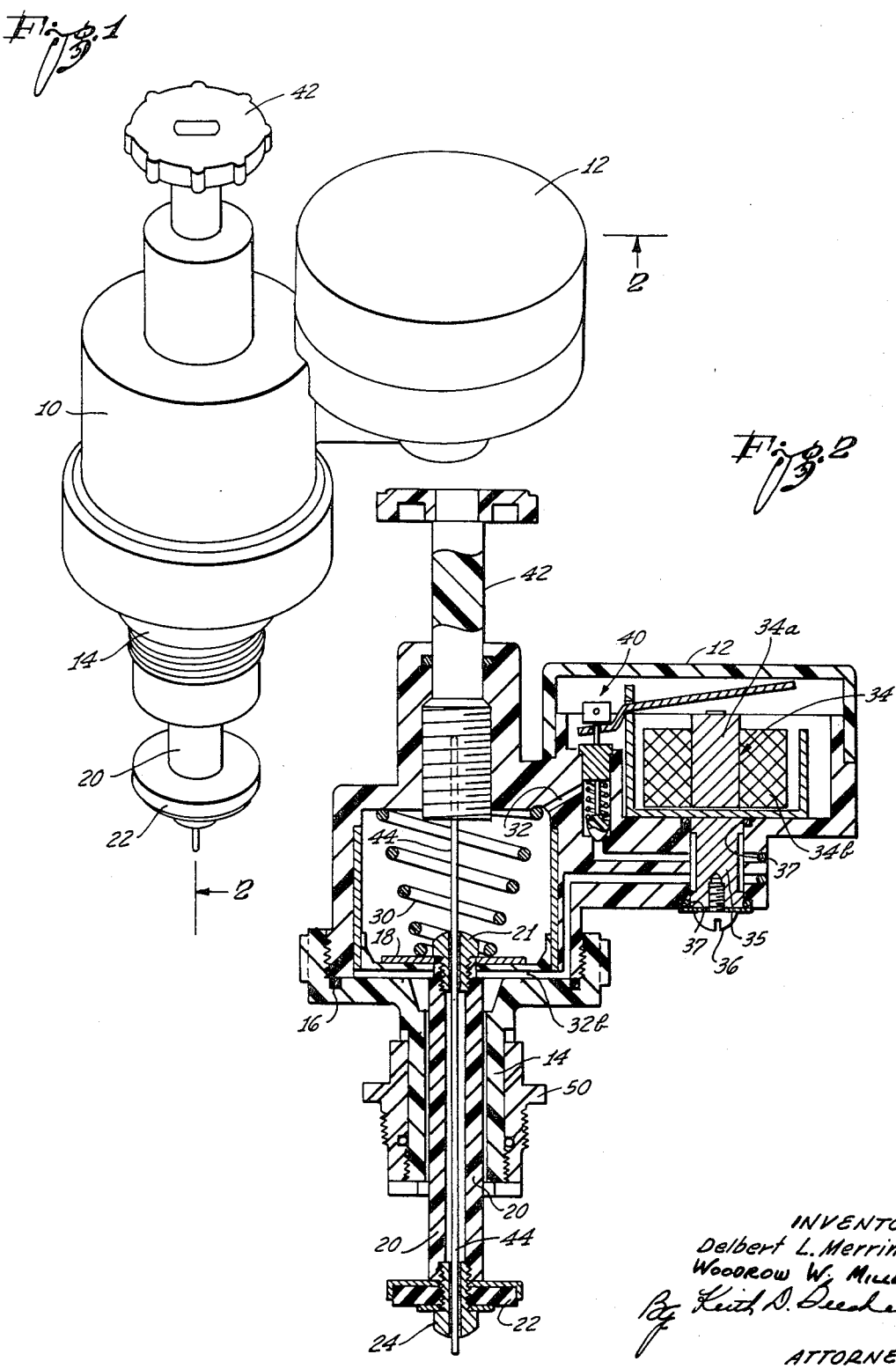

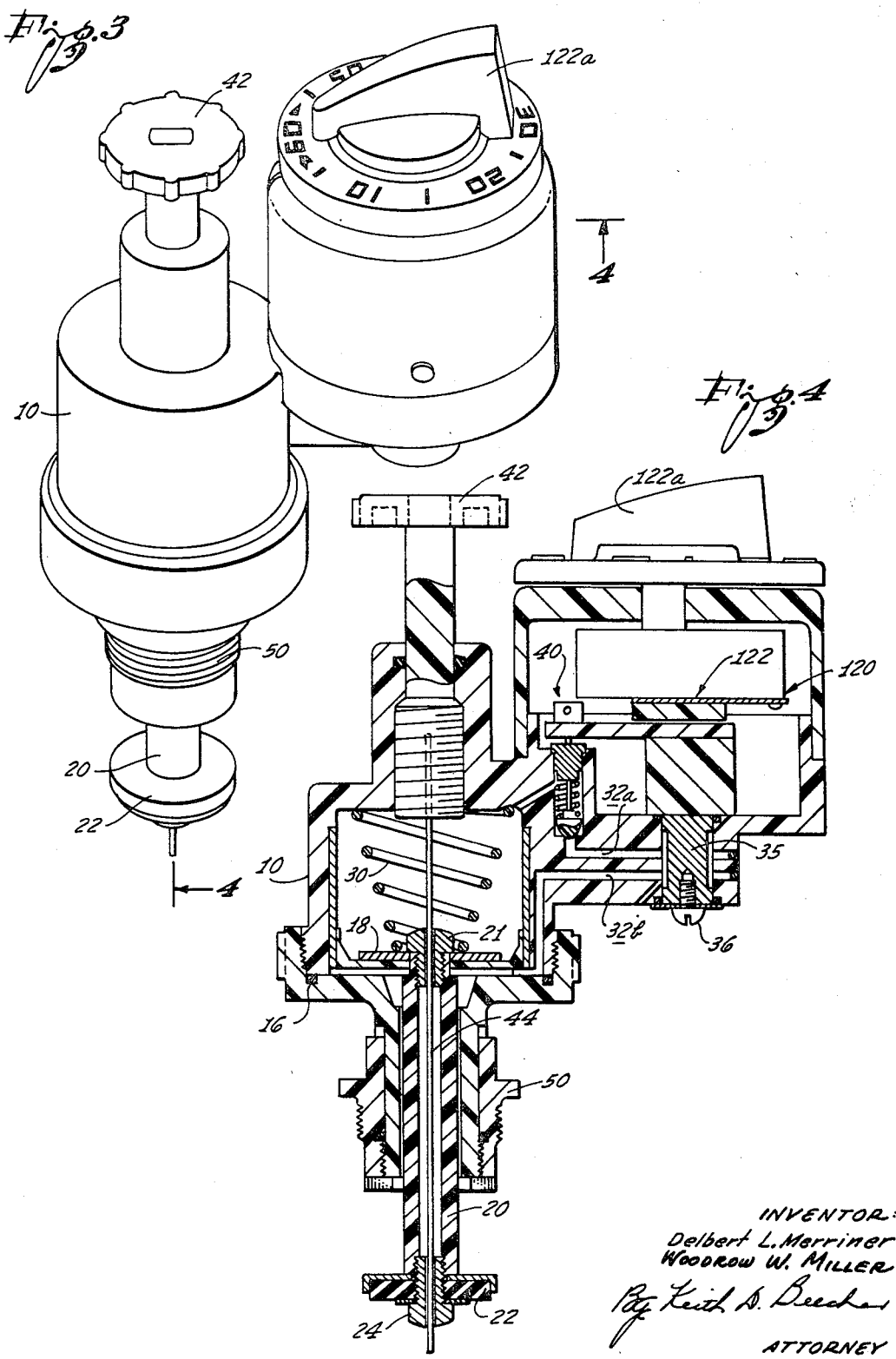

3,410,301
SOLENOID OR TIMER OPERATED PILOT VALVE FOR MAIN VALVE CONTROL
Delbert L. Merriner, Glendale, and Woodrow W. Miller, Los Angeles, Calif., assignors to Richdel, Inc., Los Angeles, Calif., a corporation of California
Filed Sept. 22, 1966, Ser. No. 581,299
4 Claims. (Cl. 137—269)

ABSTRACT OF THE DISCLOSURE

A valve assembly is provided for use, for example, in conjunction with lawn sprinkler systems, and which is of the hydraulic, pilot-operated type, wherein the casing may receive either a solenoid or a timer actuator for the pilot valve, and several pilot passages located in the casing are interconnected by a plug which cools the solenoid, in the solenoid actuated pilot embodiment of the device.

---

The present invention relates to valves, and it relates more particularly to automatically controlled valves of the hydraulic, pilot operated type.

The invention is actually concerned with an improved pilot-operated valve which may be manually or automatically operated, and which has general utility in the control of water, air, or other liquids, gases, or fluids in general.

An object of the invention is to provide such an improved valve assembly which is simple and inexpensive in its construction, yet rugged and reliable.

The improved valve assembly of the invention has particular utility in the automatic control of the flow of water, for example, and will be described herein in such an environment. The embodiments of the invention to be described may be controlled, either by manual, electrical or mechanical means, to be turned on and off automatically at timed intervals, as will be described.

For example, constructed embodiments of the valve of the invention are capable of turning off the flow of fluid therethrough after a predetermined time of from 5–60 minutes. The valves also include a manual override control which permits them to be shut off at any time.

The embodiments of the invention to be described are pilot-operated valves. These valves are specifically conceived and constructed to convert the usual lawn sprinkler antisyphon valves into a fully automatic or semiautomatic control valve. However, as mentioned above, and as will become more apparent from the following description, the valves of the invention have general utility.

Another object of the invention, therefore, is to provide such an improved valve assembly which is easy to install in existing sprinkler systems, and the like.

The features of the present invention include self-cleaning bleed ports; quiet opening and closing with no shock or hammer effect; simple and inexpensive rugged construction; and simple installation in existing systems.

Another feature of the invention is an electrically operated automatic embodiment in which the control solenoid is water cooled in a simple and expeditious manner.

Other features of the invention will become apparent from a consideration of the following description, when the description is taken in conjunction with the accompanying drawings, in which:

FIGURE 1 is a perspective view of one embodiment of the invention;

FIGURE 2 is a side section, substantially on the line 2—2 of FIGURE 1;

FIGURE 3 is a perspective view of a second embodiment of the invention; and

FIGURE 4 is a side section, substantially on the line 4—4 of FIGURE 3.

Two embodiments of the invention are to be described herein: the first embodiment, shown in FIGURES 1 and 2, includes a solenoid, and the solenoid may be energized and de-energized automatically to open and close the valve at predetermined times. The second embodiment, shown in FIGURES 3 and 4, includes a mechanical timer, and when the valve is manually opened, the timer may be simultaneously wound and set to a particular setting. Then, the timer closes the valve automatically after a predetermined time interval has elapsed.

As is well known, a problem in solenoid control valves is the excessive heating of the solenoid coil when it is energized. This is because the solenoid coil must normally be enclosed. In one of the embodiments to be described, a plug of heat-conductive material is mounted on the core of the solenoid, and this plug is disposed in the pilot passageway. This enables the liquid flowing through the pilot passageway to carry away the heat generated in the core of the solenoid.

Both of the embodiments to be described include a bleed port in the main valve stem which leads into a cylinder on the opposite side of a piston on which the stem is mounted. The bleed port is relatively large so as to avoid plugging. Also, a stationary central pin extends through the bleed port to provide a self-cleaning action as the valve stem moves back and forth. This pin also serves to limit the flow of liquid through the port so as to avoid slamming of the valve when it opens or closes.

A pilot valve is provided in the embodiments to be described, and which is operated either by the mechanical timer or solenoid described above. So long as the pilot valve is closed, the liquid through the bleed port increases pressure in the cylinder to hold the piston down and threby to hold the main valve closed. The piston area is made greater than the area of the main valve (for example, 2:1) so as to achieve a desired hydraulic action.

However, when the pilot valve is opened, the fluid from the cylinder is passed to the lower side of the piston, so as to aid the pressure in the line to move the piston to its upper position, and open the main valve. The valve stem is a loose fit in the bottom cylinder, so as to permit the liquid to escape therefrom when the pilot valve is again closed. This latter effect creates a bleed which may be controlled by a selected design of the assembly, so that the closing speed of the main valve can be established at a desired rate.

As mentioned above, the solenoid controlled embodiment of the invention is shown in FIGURES 1 and 2. This embodiment includes a valve housing 10 and a solenoid housing 12. The valve housing 10 includes a lower tubular portion 14 which is threaded to the housing and sealed thereto by means of an O-ring 16.

A piston 18 is slidable within the valve housing 10. A valve stem 20 is attached to the piston 18 by means of a screw 21. The valve stem extends through the tubular portion 14 and protrudes out through the bottom thereof.

A usual valve member 22 is mounted to the bottom of the valve stem 20 by means of a screw 24. A bleed port extends longitudinally through the valve stem 20, and through the screws 21 and 24.

A spring 30 within the valve housing biases the piston 18 towards the bottom of the cylindrical chamber defined by the valve housing 10.

The tubular portion 14 is intended to be mounted, for example, in the valve housing of a usual antisyphon type of valve, and the valve member 22 seats against the valve seat in the housing when the piston 18 is displaced to the bottom of the chamber in the valve housing 10. The spring 30, therefore, holds the valve normally in a closed condition.

In addition, water enters the chamber through the bleed port and establishes an hydraulic pressure against the piston 18. Due to the fact that the piston area is greater than the area of the valve member 22, the resulting hydraulic action holds the valve in its closed condition.

A pilot port 32 extends at an angle from the upper end of the chamber in the valve housing 10, and it extends radially across the bottom of the solenoid housing 12 as a passageway 32a.

For fabricating convenience, the passageway 32a is formed by drilling a hole in from the right hand side of the solenoid housing 12. A further passageway 32b is formed by drilling a further hole, parallel and under the passageway 32a, in from the right hand side of the solenoid housing.

The latter passageway 32b extends down the side of the valve housing 10, and into the cylindrical chamber formed by the valve housing at a point adjacent the bottom thereof.

A solenoid 34 is disposed in the solenoid housing 12; the solenoid including a core 34a and a coil 34b. A metallic plug 35 is threaded into the core 34a. The plug extends across the two passageways 32a and 32b, and it has an undercut portion. A pair of O-rings 37 seal the plug to the valve housing. The plug 35, therefore, effectively seals off the ends of the passageways 32a, 32b and forms a further channel for the flow of fluid from the passageway 32a into the passageway 32b.

The plug is held in place in the solenoid housing 12 by means of a screw 36. This serves to mount the entire solenoid within the solenoid housing 12. The water flowing through the passageways 32a and 32b serves to cool the plug 35. The conductivity of the plug cools the core 34a and enables the entire solenoid to be energized for long intervals, and completely sealed within the valve housing 12, without excessive heating. The plug 35 is composed of a suitable heat conductive material such as brass.

A pilot valve 40 is disposed in the passageway 32, 32a. The pilot valve is normally spring biased to block the flow of fluid through the passageway. However, when the solenoid is energized, the pilot valve opens and the fluid flows freely.

A hand operated control handle 42 is threaded through the top of the valve housing 10 and into engagement with the spring 30. A pin 44 is held by the screw portion of the control handle, and the rod extends down through the screw 21, through the bleed port in the valve stem 20 and through the screw 24.

It will be appreciated that so long as the pilot valve 40 is closed, the fluid will flow through the aforesaid bleed port and into the cylindrical chamber in the valve housing 10. This water, as explained above, by hydraulic action, assists the spring 30 in holding the piston 18 down on the bottom of the chamber and the valve closed.

However, when the solenoid 34 is energized, the pilot valve 40 is opened, and the fluid in the chamber flows to the underside of the piston 18. This causes the piston to move up in the chamber and the valve to open.

The pin 44 remains stationary as the valve stem so moves, so as to perform a cleaning action in the bleed port. This prevents the bleed port from becoming plugged.

The member 42 serves as a manual control for the valve, and it enables the valve to be closed manually at any time, regardless of the state of the pilot valve 40. When the member is threaded down into the valve housing, it compresses the spring 30 and forces the piston 18 down to the bottom of the chamber and closes the valve.

An interchangeable nut 50 is mounted on the tubular portion 14 so that the assembly may be adapted to fit into different types of valve systems.

It will be appreciated, therefore, that so long as the pilot valve 40 is closed, water will flow up through the bleed port. The resulting build up of water pressure across the top of the piston 18 holds the valve in a closed condition.

However, when the pilot valve 40 is opened, water flows to the under side of the piston through the pilot passages to the underside of the piston. This, in addition to the release of water pressure above the piston 18, causes the valve to open.

The stem 20 froms a loose fit in the tubular portion 14, so that the water from the pilot passage 32b, can gradually escape. This provides a control bleed to help control the closing speed of the valve.

It will be understood, of course, that the pressure of the spring 30 alone is insufficient to hold the valve closed, when the handle 42 is turned back to the normal operating position for the valve.

It will also be appreciated that the heat conductive plug 35 forms a heat sink for the solenoid 34. Thus, even though coil 34b be totally enclosed, as is essential in the construction of the assembly, excessive heating does not occur.

The second embodiment, shown in FIGURES 3 and 4, is similar in most respects to the embodiment described above, and like elements have been identified with the same numerals.

The solenoid housing 12 of the embodiment of FIGURES 1 and 2 is replaced in the embodiment of FIGURES 3 and 4, by a housing 120. The housing 120 encloses a usually spring actuated, manually set timer 122. The timer is mounted in the housing and is held in place by the plug 35. However, the plug does not perform a heat sing function in this embodiment.

The timer is provided with a handle 122a. The handle may be turned any selected amount around a time-calibrated scale (FIGURE 3) to wind the timer, and released. The timer is coupled to the pilot valve 40, so that when the handle 122a is turned from the "0" position the pilot valve is opened, causing the main valve to open. The spring action in the timer causes the handle slowly to return to "0," when that is achieved, the pilot valve is closed, thereby causing the main valve to close.

The invention provides, therefore, an inexpensive yet rugged and reliable hydraulic action type of controlled valve assembly.

While particular embodiments of the invention are shown and described, modifications may be made. The claims are intended to cover all modifications which fall within the spirit and scope of the invention.

What is claimed is:

1. A valve assembly for controlling fluid flow including: a casing defining a valve housing and a pilot control housing adjacent one another, said valve housing including an upper portion, and a tubular lower portion of reduced diameter with respect to said upper portion, said tubular lower portion having threads at the lower extremity thereof; a piston slidable within said upper portion of said valve housing; a tubular valve stem affixed to said piston and extending down through said tubular lower portion of said valve housing and protruding through the lower end thereof, said valve stem having a bleed port extending longitudinally therethrough and into said upper portion of said valve housing; spring means positioned within said upper portion of said valve housing for biasng said piston towards the bottom thereof to hold the valve assembly in a normally closed position; said casing having a first pilot passageway extending from the upper end of said upper portion of said valve housing above said piston across the bottom wall of said pilot control housing, and said casing having a second pilot passageway extending across said bottom wall of said pilot control housing spaced under said first passageway and essentially parallel thereto and extending into the lower end of said upper portion of said valve housing under said piston; a pilot valve mounted in said pilot control housing selectively to open and close said first and second passageways; a control mechanism for said pilot valve mounted in said pilot valve housing; a plug mounted in said pilot valve housing and traversing said first and second passageways therein to complete a circulation passage therebetween;

and an externally threaded and internally threaded bushing adapter threaded onto the lower extremity of said tubular lower portion of said housing to adapt the valve assembly to fit into different types of valve systems.

2. The valve assembly defined in claim 1 in which said control mechanism comprises a solenoid having a central core therein, and in which said plug is composed of metallic material and is positioned in heat conductive relationship with said core to conduct heat therefrom to fluid flowing through said first and second passageways.

3. The valve assembly defined in claim 1 in which said control mechanism comprises a spring actuated manually set timer.

4. The valve assembly defined in claim 1 and which includes a stationary pin extending from said upper portion of said valve housing down through said bleed port in said tubular valve stem to perform a cleaning action therein upon movement of said valve stem relative to said pin.

References Cited

UNITED STATES PATENTS

| | | | |
|---|---|---|---|
| 1,270,170 | 6/1918 | Kingsbury | 137—339 |
| 1,813,709 | 7/1931 | Pasman | 251—43 X |
| 2,114,961 | 4/1938 | Gille | 137—339 |
| 3,112,094 | 11/1963 | Nees et al. | 251—30 |
| 3,172,420 | 3/1965 | Brown et al. | 251—43 X |

ARNOLD ROSENTHAL, *Primary Examiner.*